US012661742B2

(12) United States Patent
Lai et al.

(10) Patent No.: US 12,661,742 B2
(45) Date of Patent: Jun. 23, 2026

(54) THICK STEEL PLATE ASSEMBLY WELDED BY LASER WELDING AND LASER WELDING METHOD THEREOF

(71) Applicant: TAIWAN MASK CORPORATION, Hsinchu County (TW)

(72) Inventors: Li-Wen Lai, Hsinchu County (TW); Wei-Lun Tsai, Hsinchu County (TW); Ching-Cheng Chen, Hsinchu County (TW); Chih-Hui Tai, Hsinchu County (TW); Hsin-I Ho, Hsinchu County (TW)

(73) Assignee: Taiwan Mask Corporation, Hsinchu County (TW)

( * ) Notice: Subject to any disclaimer, the term of this patent is extended or adjusted under 35 U.S.C. 154(b) by 6 days.

(21) Appl. No.: 18/586,844

(22) Filed: Feb. 26, 2024

(65) Prior Publication Data

US 2025/0269469 A1 Aug. 28, 2025

(51) Int. Cl.
| | |
|---|---|
| *B23K 26/26* | (2014.01) |
| *B23K 26/062* | (2014.01) |
| *B23K 26/082* | (2014.01) |
| *B23K 101/18* | (2006.01) |
| *B23K 103/04* | (2006.01) |

(52) U.S. Cl.
CPC .......... B23K 26/26 (2013.01); B23K 26/0626 (2013.01); B23K 26/082 (2015.10); *B23K 2101/18* (2018.08); *B23K 2103/04* (2018.08)

(58) Field of Classification Search
CPC .. B23K 26/26; B23K 26/062; B23K 26/0626; B23K 26/082
See application file for complete search history.

(56) References Cited

U.S. PATENT DOCUMENTS

| | | | | |
|---|---|---|---|---|
| 10,286,492 B2 * | 5/2019 | Okuda | ................. | B23K 26/123 |
| 10,722,989 B2 * | 7/2020 | Terada | .................... | B23K 31/00 |
| 11,332,920 B2 * | 5/2022 | Houghton | ................. | E04B 1/30 |
| 12,257,647 B2 * | 3/2025 | Yoshida | ............... | B23K 26/082 |
| 2014/0124489 A1 * | 5/2014 | Zhang | .................. | B23K 26/348 |
| | | | | 219/137 R |
| 2021/0162539 A1 * | 6/2021 | Kayahara | ........... | B23K 26/0676 |

FOREIGN PATENT DOCUMENTS

| | | |
|---|---|---|
| CN | 102615395 B | 2/2015 |
| CN | 113182688 A | 7/2021 |
| CN | 113369676 A | 9/2021 |
| CN | 113695744 A | 11/2021 |
| CN | 114178698 A | 3/2022 |
| CN | 114799526 A | 7/2022 |
| JP | 2015089562 A | 5/2015 |

* cited by examiner

*Primary Examiner* — Woody A Lee, Jr.
(74) *Attorney, Agent, or Firm* — Rosenberg, Klein & Lee

(57) ABSTRACT

A thick steel plate assembly welded by laser welding and a laser welding method thereof are disclosed. The thick steel plate assembly comprises two steel plates and a filler region. A joint face of the steel plates extends along a joint line. At least one portion of the joint face of one of the thick plate steels is formed with a groove along a grooving line. The filler region is formed by feeding a filler into the groove and using a laser to weld the joint face having the groove through the filler. After the filler region is cooled and solidified, the thick steel plates are combined with each other. A thickness of each filler layer in the filler region is between 4 and 6 mm. Thus, the process can be simplified greatly and the cost can be reduced.

4 Claims, 9 Drawing Sheets

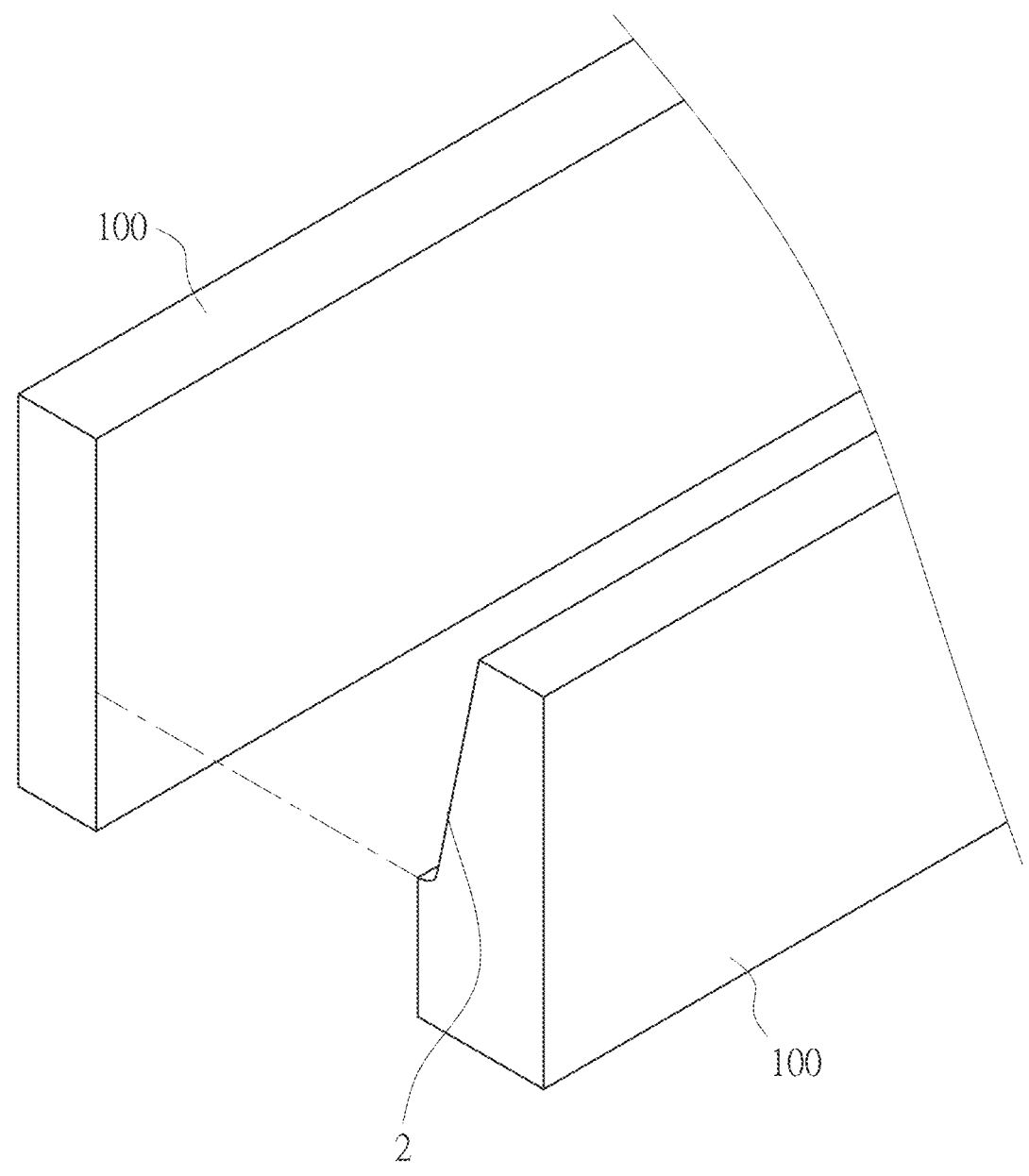
F I G . 1

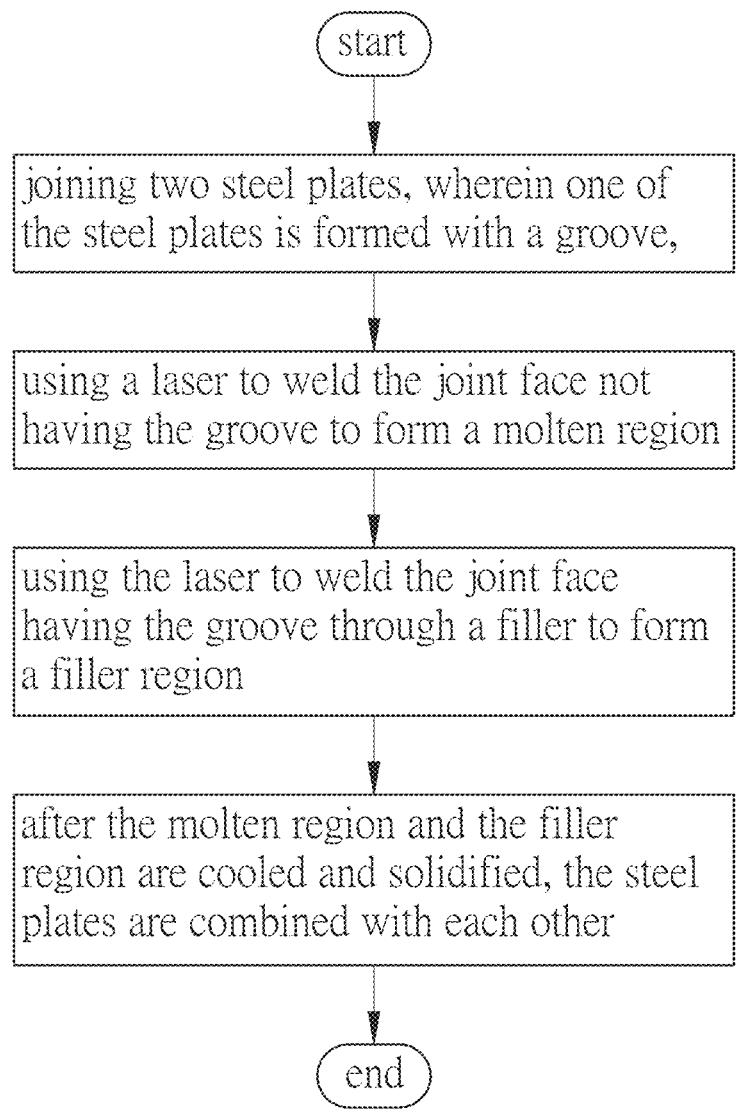

start joining two steel plates, wherein one of the steel plates is formed with a groove, using a laser to weld the joint face not having the groove to form a molten region using the laser to weld the joint face having the groove through a filler to form a filler region after the molten region and the filler region are cooled and solidified, the steel plates are combined with each other end

F I G . 2

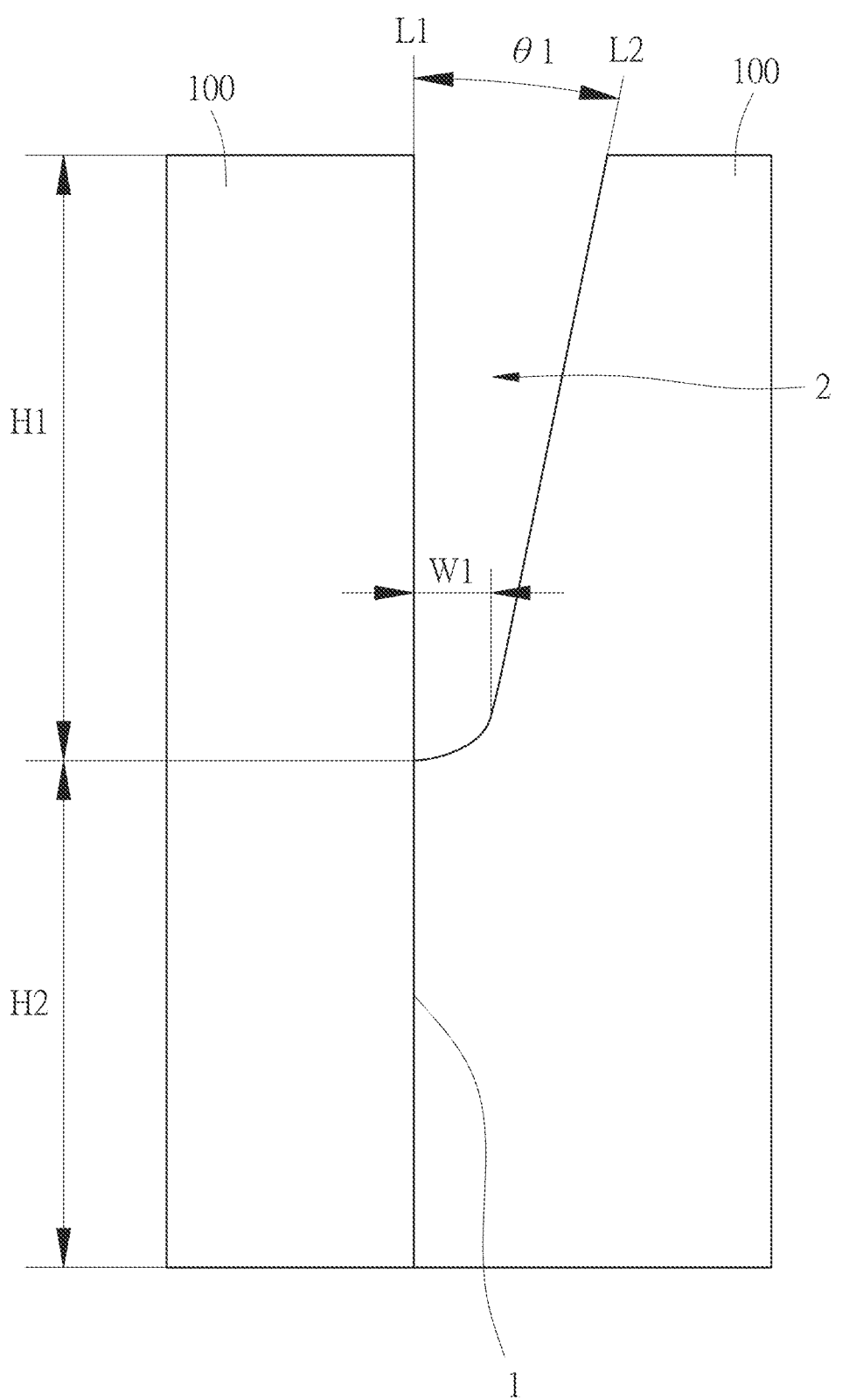
F I G . 3

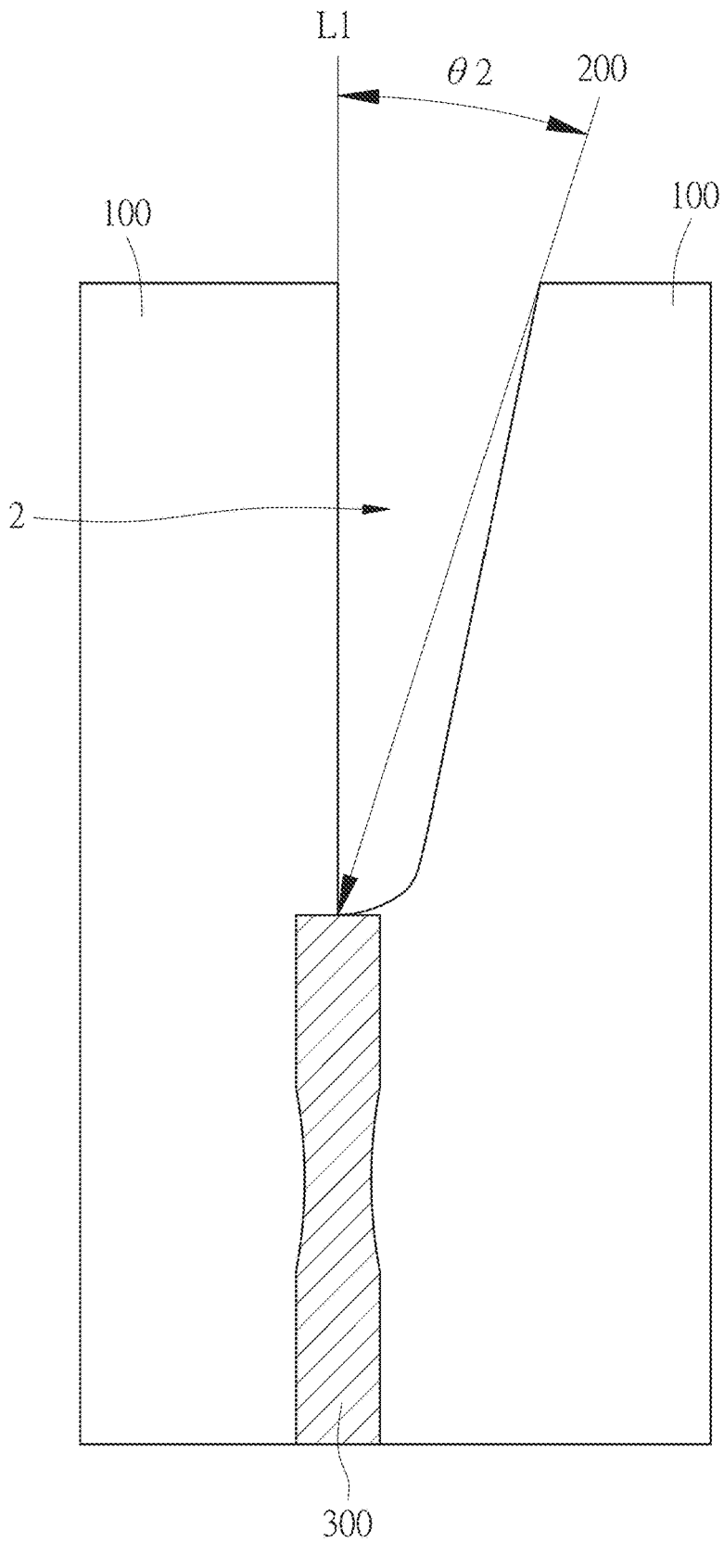
F I G . 4

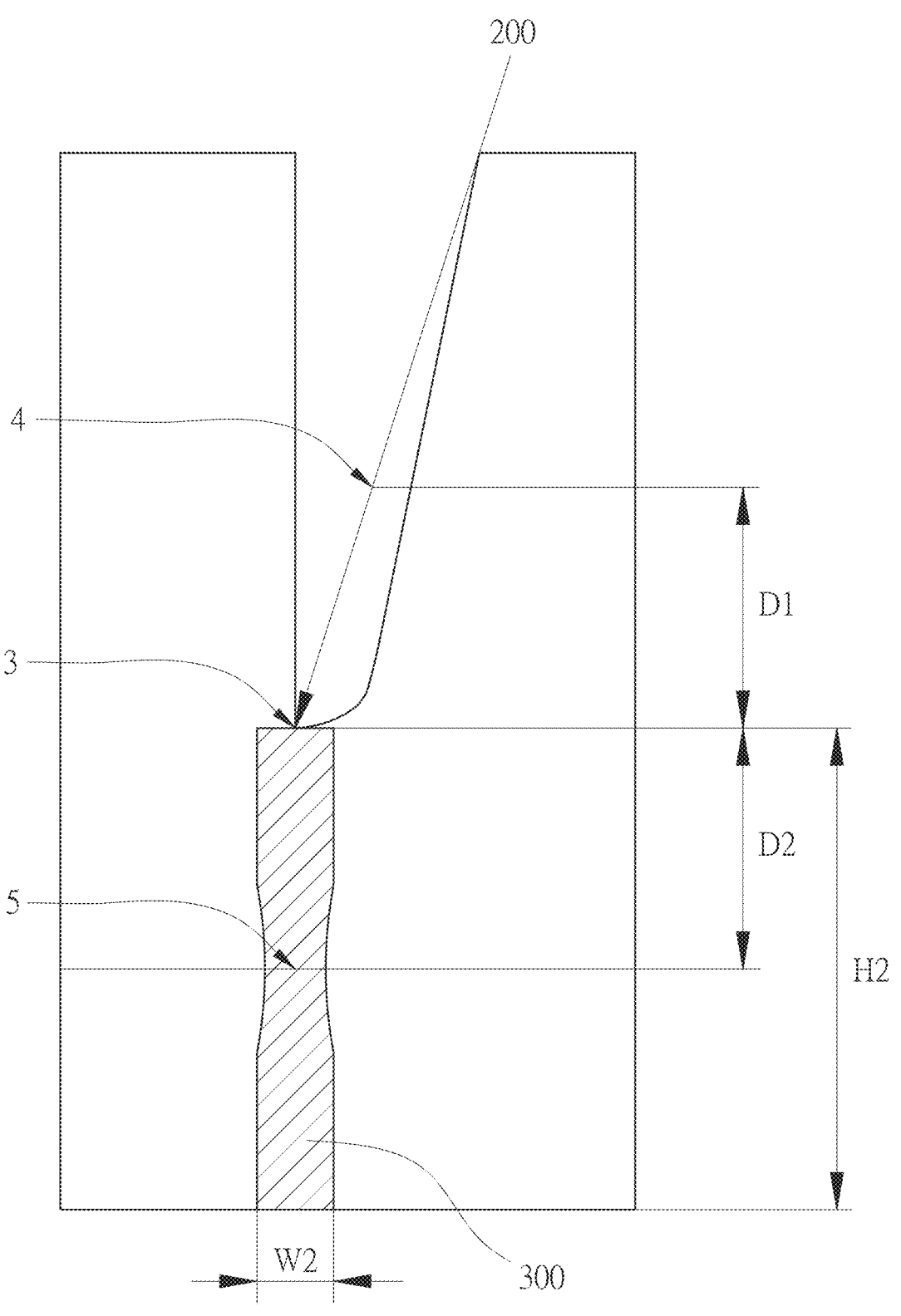
F I G . 5

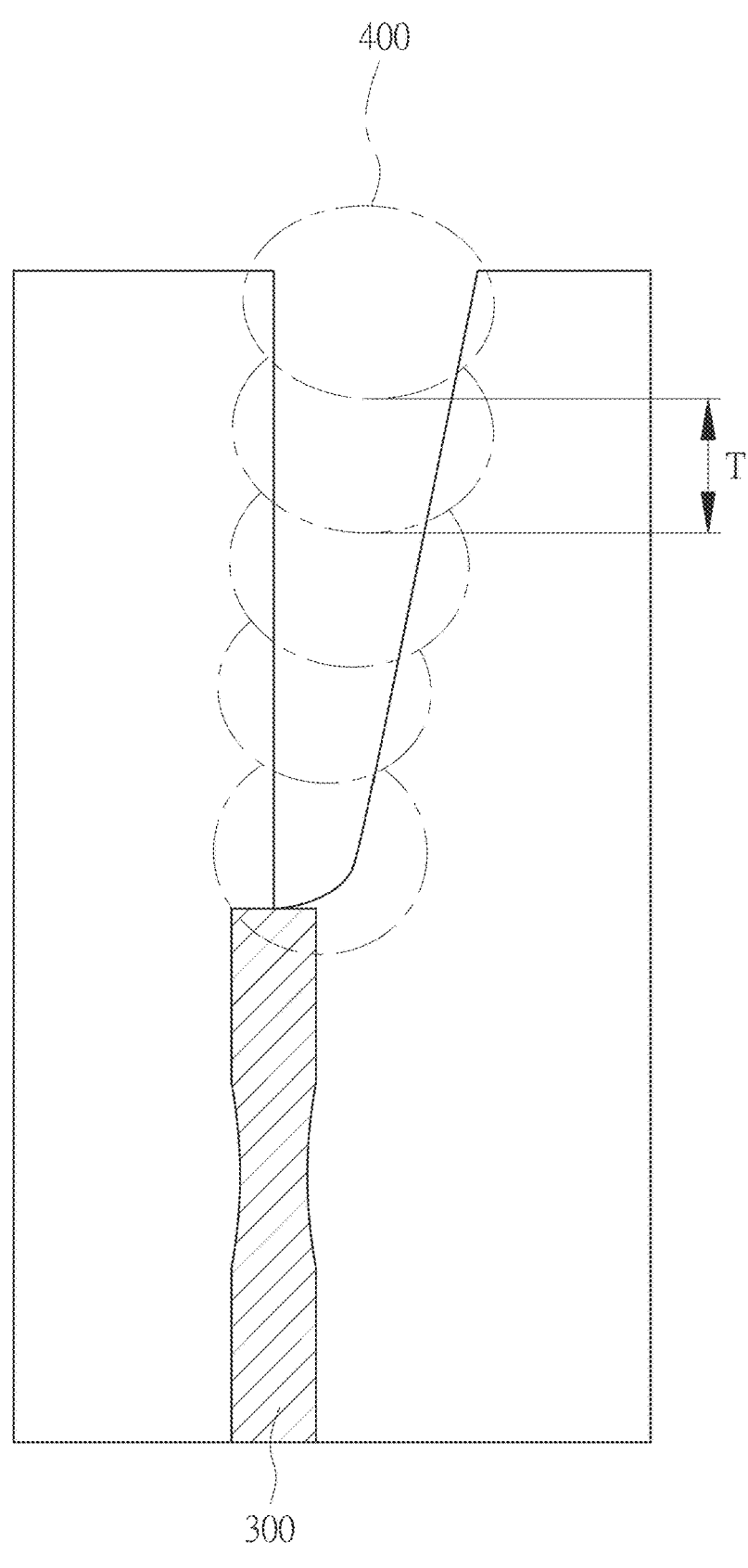
F I G . 6

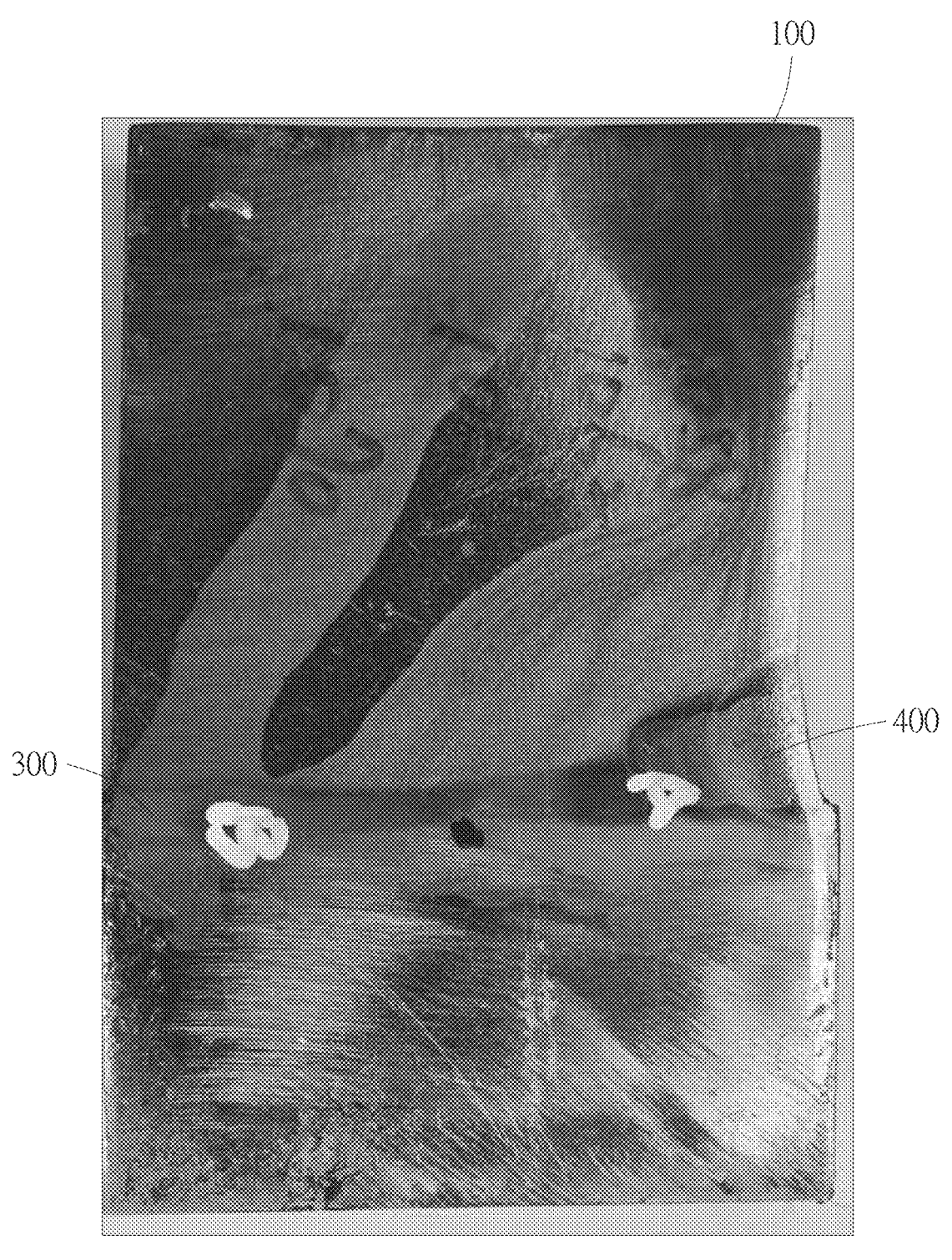
F I G . 7

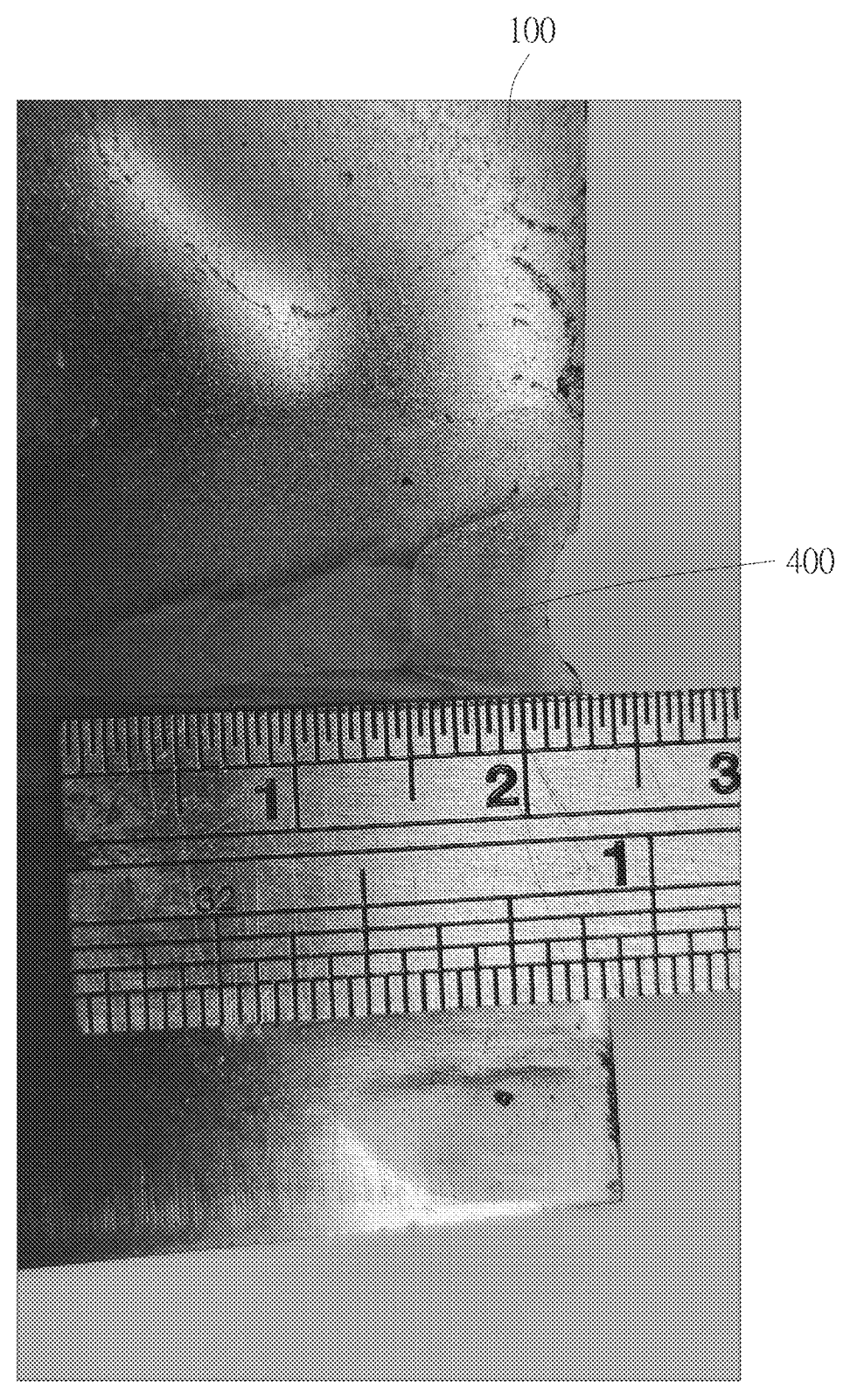
F I G . 8

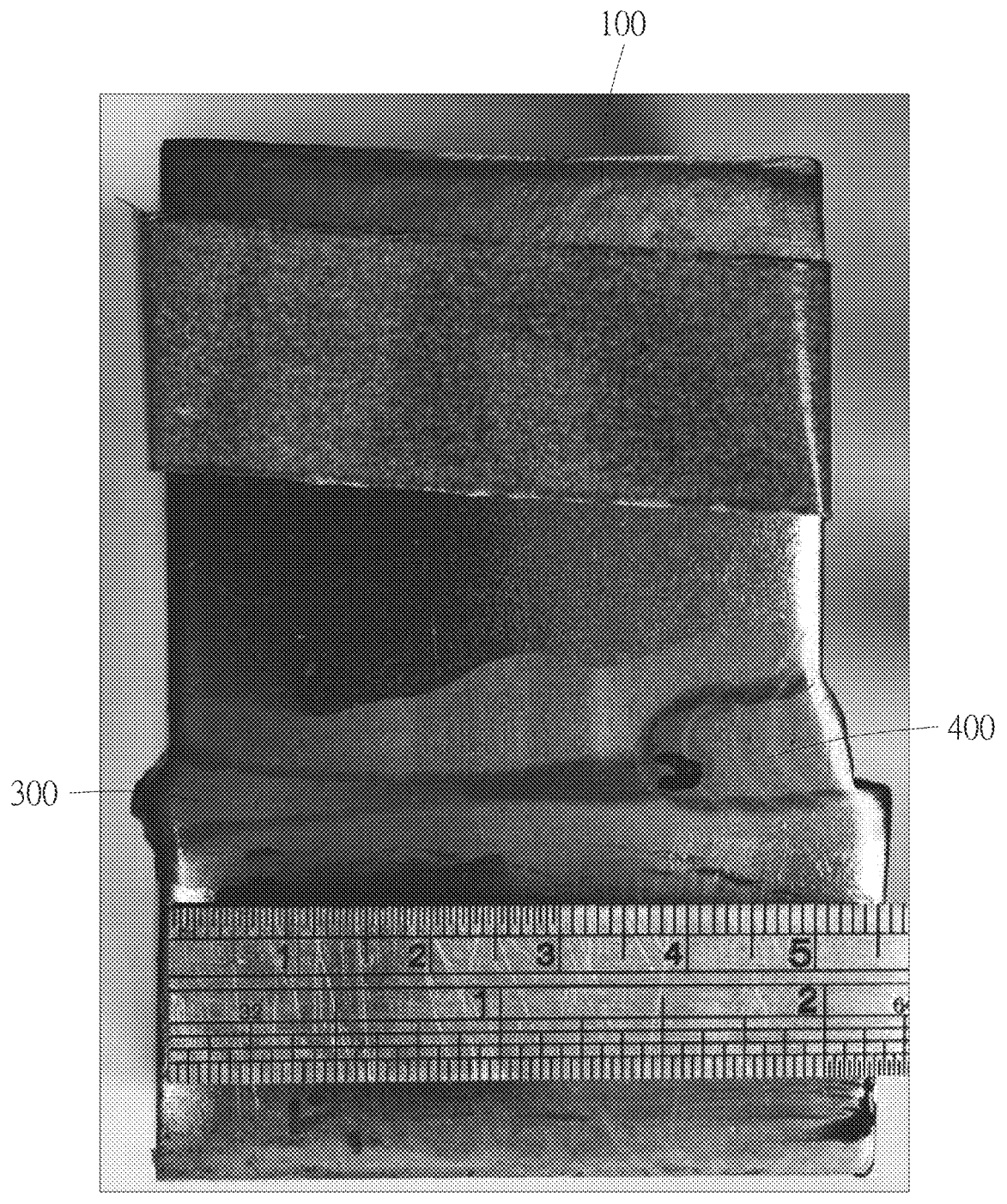
F I G . 9

THICK STEEL PLATE ASSEMBLY WELDED BY LASER WELDING AND LASER WELDING METHOD THEREOF

FIELD OF THE INVENTION

The present invention relates to a thick steel plate assembly welded by laser welding and a laser welding method for thick steel plates.

BACKGROUND OF THE INVENTION

Using a laser to weld thick steel plates is a common technology nowadays. For example, Chinese Patent Publication No. CN 113695744 A discloses an energy-constrained, narrow-gap, wire-filling laser welding method, relating to the field of laser welding technology. The method includes the following steps: having a groove design, wherein a groove is formed between two parts to be welded; preparation before welding, wherein the two parts to be welded are fixed on the workbench, and a protective gas is used to clean the groove; pre-welding, wherein a welding wire is fed into the bottom of the groove, and a laser beam pre-welds the welding wire and the parts to be welded for the welding wire to be fixed at the bottom of the groove, and pre-welding uses a positive defocused laser beam to enter the groove for welding; continuous welding, wherein a negative defocused laser beam enters the groove for welding, and the focal point is located inside the welding wire.

However, in the aforementioned patent, it is necessary to machine bevels on both parts to be welded to form the groove. The process is more troublesome and the cost is higher.

SUMMARY OF THE INVENTION

According to one aspect of the present invention, a laser welding method for thick steel plates is provided. The laser welding method comprises the following steps of: joining two thick steel plates, wherein a joint face of the thick steel plates extends along a joint line, at least one portion of the joint face of one of the thick plate steels is formed with a groove along a grooving line, a grooving angle is defined between the grooving line and the joint line, the grooving angle is between 3 degrees and 15 degrees, and a bottom width of the groove is between R0 and R10 mm; feeding a filler into the groove and using a laser to weld the joint face having the groove through the filler to form a filler region, wherein the laser has a power of between 7,000 and 20,000 watts. After the filler region is cooled and solidified, the thick steel plates are combined with each other. A thickness of each filler layer in the filler region is between 4 and 6 mm.

According to another aspect of the present invention, a thick steel plate assembly welded by laser welding is provided. The thick steel plate assembly comprises two thick steel plates and a filler region. The steel plates are joined. A joint face of the steel plates extends along a joint line. At least one portion of the joint face of one of the thick plate steels is formed with a groove along a grooving line. A grooving angle is defined between the grooving line and the joint line. The grooving angle is between 3 degrees and 15 degrees. A bottom width of the groove is between R0 and R10 mm. The filler region is formed by feeding a filler into the groove and using a laser to weld the joint face having the groove through the filler. The laser has a power of between 7,000 and 20,000 watts. After the filler region is cooled and solidified, the thick steel plates are combined with each other. A thickness of each filler layer in the filler region is between 4 and 6 mm.

Preferably, one portion not having the groove of the joint face of one of the thick plate steels has a depth greater than 0 mm but not greater than 50 mm. Before using the laser to weld the joint face having the groove through the filler, the joint face not having the groove is welded using the laser. A welding angle is defined between the laser and the joint line. The welding angle is between 0 degrees and 10 degrees. The laser welds the joint face to form a molten region extending along the joint line. A molten depth of the molten region is substantially equal to the depth of the joint face not having the groove. A molten width of the molten region is between 4 and 7 mm. After the molten region and the filler region are cooled and solidified, the thick steel plates are combined with each other.

Preferably, when the laser is used to weld the joint face not having the groove, at least one of the following conditions is met: a defocusing distance of the laser is between 0 and $\pm H/2$ mm, H is the depth of the joint face not having the groove; the laser has a power variation of $\pm 3\%$, a wavelength of the laser is between 1030 and 1080 nanometers; the laser has a welding speed ranging from 5 to 80 millimeters per second; when the thick steel plates are joined, the thick steel plates have a clearance range of not more than 5% of a width of the thick steel plates; the power of the laser is between 20,000 and 30,000 watts; a protective gas is provided to remove a plasma generated during welding of the laser; the protective gas is one of argon, helium, nitrogen and carbon dioxide, or a combination thereof.

Preferably, an action of the laser is one of scanning, robotic arc scanning and swing scanning. The laser has a swing frequency ranging from 0 to 100 Hz.

Preferably, when the laser is used to weld the joint face having the groove through the filler, at least one of the following conditions is met: the laser has a welding speed ranging from 5 to 30 millimeters per second; the filler is fed at a feeding speed ranging from 10 to 200 millimeters per second; a feeding angle is defined between the filler and the joint line and the feeding angle is between 0 degrees and 60 degrees; the bottom width is a diameter of a circle at a bottom of the groove.

According to the above technical features, the present invention can achieve the following effects:

Since only one of the thick plate steels is formed with the groove, the process can be simplified greatly and the cost can be reduced.

The bottom of the groove has a circle to ensure that there is no dead space for subsequent filling.

BRIEF DESCRIPTION OF THE DRAWINGS

FIG. 1 is an exploded view of an embodiment the present invention;

FIG. 2 is a flow block diagram of the embodiment of the present invention;

FIG. 3 is a front view of the embodiment of the present invention, showing the groove;

FIG. 4 is a first schematic view of the embodiment of the present invention, showing the welding angle;

FIG. 5 is a second schematic view of the embodiment of the present invention, showing the defocusing distance;

FIG. 6 is a third schematic view of the embodiment of the present invention, showing the filler region;

FIG. 7 is a first photograph of the embodiment of the present invention;

FIG. 8 is a second photograph of the embodiment of the present invention; and FIG. 9 is a third photograph of the embodiment of the present invention.

DETAILED DESCRIPTION OF THE PREFERRED EMBODIMENTS

Embodiments of the present invention will now be described, by way of example only, with reference to the accompanying drawings.

As shown in FIG. 1 through FIG. 3, the present invention discloses a thick steel plate assembly welded by laser welding and a laser welding method for thick steel plates.

The laser welding method for thick steel plates comprises the following steps:

Two thick steel plates 100 are joined. A joint face 1 of the thick steel plates 100 extends along a joint line L. When the thick steel plates 100 are joined, the thick steel plates 100 have a clearance range of not more than 5% of the width of the thick steel plates 100.

At least one portion of the joint face 1 of one of the thick plate steels 100 is formed with a groove 2 along a grooving line L2. A grooving angle $\theta 1$ is defined between the grooving line L2 and the joint line L1. The grooving angle $\theta 1$ is between 3 degrees and 15 degrees. The bottom width W1 of the groove 2 is between R0 and R10 mm. The depth (i.e., the first depth H1) of the groove 2 is between 10 and 50 mm. In actual implementation, the bottom width W1 may be the diameter of a circle at the bottom of the groove 2 to ensure that there is no dead space for subsequent filling.

Please refer to FIG. 2 through FIG. 5. One portion not having the groove 2, (i.e., the second depth H2) of the joint face 1 of one of the thick plate steels 100 has a depth greater than 0 mm but not greater than 50 mm. The joint face 1 not having the groove 2 is first welded using a laser 200. A welding angle $\theta 2$ is defined between the laser 200 and the joint line L. The welding angle $\theta 2$ is between 0 degrees and 10 degrees.

The laser 200 welds the joint face 1 to form a molten region 300 extending along the joint line L. The molten depth of the molten region 300 is substantially equal to the depth of the joint face 1 not having the groove 2. The molten width W of the molten region 300 is between 4 and 7 mm.

A defocusing distance of the laser 200 is between 0 and ±25 mm. That is, the positive defocusing distance D1 is up to 25 mm, and the negative defocusing distance D2 is up to −25 mm, which is equivalent to half of the second depth H2, namely, the depth of the joint face not having the groove 2. If the surface of the thick steel plates 100 serves as the focal point 3, the positive defocusing point 4 will be 25 mm above the focal point 3, and the negative defocusing point 5 will be 25 mm below the focal point 3.

The laser 200 has a power variation of ±3%. The wavelength of the laser 200 is between 1030 and 1080 nanometers. The laser 200 has a welding speed ranging from 5 to 80 millimeters per second. The power of the laser 200 is between 20,000 and 30,000 watts.

The above-mentioned values may be changed according to the second depth H2. For example, when the second depth H2 is between 40 and 50 mm, the power of the laser 200 may be 30,000 watts, and the welding speed is between 5 and 80 millimeters per second.

A protective gas is used to remove a plasma generated during the welding of the laser 200. The protective gas is one of argon, helium, nitrogen and carbon dioxide, or a combination thereof.

By changing the defocusing distance and the power variation, the laser 200 enables the joint face 1 to form the molten region 300 extending along the joint line L.

Please refer to FIG. 6 and FIG. 7, in cooperation with FIG. 2 through FIG. 4. Next, a filler is fed into the groove 2, and the laser 200 welds the joint face 1 having the groove 2 through the filler to form a filler region. The thickness T of each filler layer in the filler region 400 is between 4 and 6 mm.

The power of the laser 200 is between 7,000 and 20,000 watts. The welding speed of the laser 200 is between 5 and 30 millimeters per second. The filler is fed at a feeding speed ranging from 10 to 200 millimeters per second. A feeding angle is defined between the filler and the joint line L1. The feeding angle is between 0 degrees and 60 degrees.

The action of the laser 200 is one of scanning, robotic arc scanning and swing scanning. The laser 200 has a swing frequency ranging from 0 to 100 Hz.

After the molten region 300 and the filler region 400 are cooled and solidified, the thick steel plates 100 are combined with each other to form a thick steel plate assembly.

Please refer to FIG. 8 and FIG. 9, in cooperation with FIG. 3 and FIG. 6. As can be seen from the photographs of the actual thick steel plate assembly manufactured by the laser welding method, the thickness T of each filler layer in the filler region 400 is indeed between 4 and 6 mm, the first depth H1 is indeed between 10 and 50 mm, and the second depth H2 is indeed not greater than 50 mm.

Since only one of the thick plate steels 100 is formed with the groove 2, the process can be simplified greatly and the cost can be reduced.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A laser welding method for thick steel plates, comprising the following steps of:

joining two thick steel plates, wherein a joint face of the thick steel plates extends along a joint line, at least one portion of the joint face is defined along a grooving line of one of the thick steel plates with a groove, a grooving angle is defined between the grooving line and the joint line, the grooving angle is between 3 degrees and 15 degrees, and a bottom width of the groove is between R0 and R10 mm, a second portion of the joint face is defined between the thick steel plates in a region without a groove;

feeding a filler into the groove and using a laser to weld the at least one portion of the joint face having the groove through the filler to form a filler region, wherein the laser has a power of between 7,000 and 20,000 watts;

wherein a thickness of each filler layer in the filler region is between 4 and 6 mm;

wherein the second portion of the joint face has a depth greater than 0 mm but not greater than 50 mm, before using the laser to weld the at least one portion of the joint face having the groove through the filler, the second portion of the joint face is first welded using the laser, a welding angle is defined between the laser and the joint line, the welding angle is between 0 degrees and 10 degrees; the laser welds the second portion of the joint face to form a molten region extending along the joint line, a molten depth of the molten region is substantially equal to the depth of the second portion of the joint face, a molten width of the molten region is between 4 and 7 mm, the combination of the thick steel plates by laser welding is completed when the molten region and the filler region are cooled and solidified.

2. The laser welding method as claimed in claim 1, wherein when the laser is used to weld the second portion of the joint face not having the groove, at least one of the following conditions is met: a defocusing distance of the laser is between 0 and ±H/2 mm, H is the depth of the second portion of the joint face not having the groove; the laser has a power variation of ±3%, a wavelength of the laser is between 1030 and 1080 nanometers; the laser has a welding speed ranging from 5 to 80 millimeters per second; when the thick steel plates are joined, the thick steel plates have a clearance range of not more than 5% of a width of the thick steel plates; the power of the laser is between 20,000 and 30,000 watts; a protective gas is provided to remove a plasma generated during welding of the laser; the protective gas is one of argon, helium, nitrogen and carbon dioxide, or a combination thereof.

3. The laser welding method as claimed in claim 1, wherein an action of the laser is one of scanning, robotic arc scanning and swing scanning, and the laser has a swing frequency ranging from 0 to 100 Hz.

4. The laser welding method as claimed in claim 1, wherein when the laser is used to weld the at last one portion of the joint face having the groove through the filler, at least one of the following conditions is met: the laser has a welding speed ranging from 5 to 30 millimeters per second; the filler is fed at a feeding speed ranging from 10 to 200 millimeters per second; a feeding angle is defined between the filler and the joint line and the feeding angle is between 0 degrees and 60 degrees; the bottom width is a diameter of a circle at a bottom of the groove.

* * * * *